US008637619B2

(12) United States Patent
Koenig et al.

(10) Patent No.: US 8,637,619 B2
(45) Date of Patent: Jan. 28, 2014

(54) PROCESS FOR PREPARING HIGH-REACTIVITY ISOBUTENE HOMO- OR COPOLYMERS

(71) Applicant: BASF SE, Ludwigshafen (DE)

(72) Inventors: Hannah Maria Koenig, Mannheim (DE); Klaus Muelbach, Gruenstadt (DE); Matthias Kiefer, Ludwigshafen (DE); Sergei V. Kostjuk, Minsk (BY); Irina Vasilenko, Minsk (BY); Alexander Frolov, Svisloch (BY)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/667,828

(22) Filed: Nov. 2, 2012

(65) Prior Publication Data
US 2013/0059995 A1    Mar. 7, 2013

Related U.S. Application Data

(63) Continuation of application No. 13/029,413, filed on Feb. 17, 2011, now Pat. No. 8,349,977.

(60) Provisional application No. 61/417,895, filed on Nov. 30, 2010, provisional application No. 61/315,431, filed on Mar. 19, 2010, provisional application No. 61/305,159, filed on Feb. 17, 2010.

(51) Int. Cl.
*C08F 4/14* (2006.01)
*C08F 10/10* (2006.01)

(52) U.S. Cl.
USPC ........ 526/237; 526/348.6; 526/210; 526/212; 526/290; 526/348.7

(58) Field of Classification Search
USPC ................. 526/237, 64, 210, 212, 290, 348.7
See application file for complete search history.

(56) References Cited

U.S. PATENT DOCUMENTS

| 5,169,914 A | | 12/1992 | Kaszas et al. |
| 5,324,878 A | * | 6/1994 | Brunelli et al. ............... 585/508 |
| 5,340,881 A | | 8/1994 | Kennedy et al. |
| 5,408,018 A | | 4/1995 | Rath |

FOREIGN PATENT DOCUMENTS

| DE | 27 02 604 A1 | 7/1978 | |
| DE | 19825334 A1 | 12/1999 | |
| EP | 0 145 235 A1 | 6/1985 | |
| WO | WO 99/64482 | * 12/1999 | ............ C08F 10/10 |
| WO | WO 99/64482 A1 | 12/1999 | |
| WO | WO 2010/066809 A1 | 6/2010 | |
| WO | WO 2010/125035 A1 | 11/2010 | |
| WO | WO 2010/139684 A1 | 12/2010 | |

OTHER PUBLICATIONS

Edward C. Leonard., "High Polymers", Wiley-Interscience, A Division of John Wiley & Sons, Inc., vol. XXIV, (part 2), 1971, 1 front page, pp. 713-733.
James D. Burrington, et al., "Cationic polymerization using heteropolyacid salt catalysts", Topics in Catalysis, vol. 23, Nos. 1-4, Aug. 2003, pp. 175-181.
Sergei V. Kostjuk, et al., "Novel Initiating system based on $AICl_3$ etherate for quasiliving cationic polymerization of styrene", Polymer Bulletin, vol. 52, 2004, pp. 227-234.
Sergei V. Kostjuk, et al., "Cationic Polymerization of Styrene in Solution and Aqueous Suspension Using $B(C_6F_5)_3$ as a Water-Tolerant Lewis Acid", Macromolecules, vol. 39, No. 9, Apr. 8, 2006, pp. 3110-3113.
Y. Li et al.: "Electron-Pair-Donor Reaction Order in the Cationic Polymerization of Isobutylene Coinitiated by AlCl3" in: Journal of Polymer Science, Part A: Polymer Chemistry, vol. 45, No. 14, pp. 3053-3061 (2007).
L. Ambroz et al.: "Donor-Acceptor-Interactions in Cationic Polymerization. II. Influence of Some Bases of Polymerization of Isobutylene" in: Journal of Polymer Science, vol. 30, pp. 381-389 (2003).
M. Bahadur et al.: "Dimethylaluminium Chloride Catalyzed Living Isobutylene Polymerization" in: Macromolecules vol. 33, pp. 9548-9552 (2000).
International Search Report of corresponding PCT/EP2011/051929, 2011.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

Preparation of high-reactivity isobutene homo- or copolymers with a content of terminal vinylidene double bonds per polyisobutene chain end of at least 50 mol % and a polydispersity of preferably 1.05 to less than 3.5, by polymerizing isobutene or an isobutene-comprising monomer mixture in the presence of an aluminum trihalide-donor complex effective as a polymerization catalyst or of an alkylaluminum halide-donor complex, especially of an aluminum trichloride-donor complex, said complex comprising, as the donor, an organic compound with at least one ether function or a carboxylic ester function.

24 Claims, No Drawings

PROCESS FOR PREPARING HIGH-REACTIVITY ISOBUTENE HOMO- OR COPOLYMERS

The present application is a Continuation application of Ser. No. 13/029,413 which claims priority to No. 61/417,895 having a filing date of Nov. 30, 2010; No. 61/315,431 having a having a filing date of Mar. 19, 2010; and No. 61/305,159 having a filing date of Feb. 17, 2010.

The present invention relates to a novel process for preparing high-reactivity isobutene homo- or copolymers with a content of terminal vinylidene double bonds per polyisobutene chain end of at least 50 mol %. The present invention further relates to novel isobutene polymers.

In contrast to so-called low-reactivity polymers, high-reactivity isobutene homo- or copolymers are understood to mean those polyisobutenes which comprise a high content of terminal ethylenic double bonds (α-double bonds), specifically in practice usually of at least 80 mol %, based on the individual chain ends of the polyisobutene macromolecules. In the context of the present application, vinylidene groups are understood to mean those double bonds whose position in the polyisobutene, macromolecule is described by the general formula

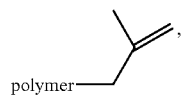

i.e. the double bond is present in an a position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of DE-A 27 02 604 by cationic polymerization of isobutene in the liquid phase in the presence of boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w$/$M_n$).

Polyisobutenes with a similarly high proportion of terminal double bonds but with a narrower molecular weight distribution are, for example, obtainable by the process of ER-A 145 235, U.S. Pat. No. 5,408,018 and WO 99/64482, the polymerization being effected in the presence of a deactivated catalyst, for example of a complex of boron trifluoride with alcohols and/or ethers.

High-reactivity polyisobutenes are also obtainable by living cationic polymerization of isobutene and subsequent dehydrohalogenation of the resulting polymerization product, for example by the process from U.S. Pat. No. 5,340,881. However, such a process is complex since the halogen end group introduced with the living cationic polymerization has to be eliminated in a separate step in order to generate the double bond.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Cationic polymerization using heteropolyacid salt catalysts" in Topics in Catalysis Vol. 23, p. 175-181 (2003), James D. Burrington et al. indicate that, with aluminum trichloride as a polymerization catalyst for isobutene, only low-reactivity polyisobutenes with a low content of terminal vinylidene double bonds (α-double bonds) can be obtained. For instance, table 1 on page 178 of this literature article cites an example of a polyisobutene prepared with $AlCl_3$, which has a number-average molecular weight $M_n$ of 1000-2000, a polydispersity $M_w$/$M_n$ of 2.5-3.5 and a content of vinylidene isomer (α-double bond) of only 5% (in addition to 65% "tri", 5% "β" and 25% "tetra").

In the literature article "Novel initiating system based on $AlCl_3$ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/di-n-butyl ether complex for polymerization of styrene. The polydispersities $M_w$/$M_n$ of the styrene polymers thus prepared are "~2.5" (see summary) or "~3" (see page 230).

It was an object of the present invention to provide a process for preparing high-reactivity isobutene homo- or copolymers with a content of terminal vinylidene double bonds per polyisobutene chain end of at least 80 mol % and simultaneously with a narrow molecular weight distribution (i.e. low polydispersities) in acceptable yields. The catalyst system should at the same time have sufficient activity and service life, the handling thereof should be unproblematic and it should not be prone to failure.

The object was achieved by a process for preparing high-reactivity isobutene homo- or copolymers with a content of terminal vinylidene double bonds per polyisobutene chain end of at least 50 mol %, which comprises polymerizing isobutene or an isobutene-comprising monomer mixture in the presence of an aluminum trihalide-donor complex effective as a polymerization catalyst or of an alkylaluminum halide-donor complex, said complex comprising, as the donor, an organic compound with at least one ether function or a carboxylic ester function.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butenes.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethyl-propyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(tri-fluoromethyl)-phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkyl-phenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

A suitable aluminum trihalide is especially aluminum trifluoride, aluminum trichloride or aluminum tribromide. A useful alkylaluminum halide is especially a mono($C_1$- to $C_4$-alkyl)aluminum dihalide or a di($C_1$- to $C_4$-alkyl)aluminum monohalide, for example methylaluminum dichloride, ethylaluminum dichloride, dimethylaluminum chloride or diethylaluminum chloride. In a preferred embodiment, isobutene or an isobutene-comprising monomer mixture is polymerized in the presence of an aluminum trichloride-donor complex effective as a polymerization catalyst.

If the aluminum trihalide-donor complex or alkylaluminum halide-donor complex effective as a polymerization catalyst comprises, as the donor, an organic compound with at least one ether function, compounds with at least one ether function are also understood to mean acetals and hemiacetals.

In a preferred embodiment of the present invention, an aluminum trihalide-donor complex or an alkylaluminum halide complex, especially an aluminum trichloride-donor complex, is used, which comprises, as the donor, a dihydrocarbyl ether of the general formula $R^1$—O—$R^2$ in which the variables $R^1$ and $R^2$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous as donors for the aluminum trihalide-donor complexes or the alkylaluminum halide complexes, especially the aluminum trichloride-donor complexes.

In a further preferred embodiment of the present invention, as an alternative, an aluminum trihalide-donor complex or an alkylaluminum halide complex, especially an aluminum trichloride-donor complex, is used, which comprises, as the donor, a hydrocarbyl carboxylate of the general formula $R^3$—$COOR^4$ in which the variables $R^3$ and $R^4$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexane-carboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous as a donor for the aluminum trihalide-donor complexes or the alkylaluminum halide complexes, especially the aluminum trichloride-donor complexes.

In addition, particularly advantageous dihydrocarbyl ethers and hydrocarbyl carboxylates as donors for the aluminum trihalide-donor complexes or the alkylaluminum halide complexes, especially the aluminum trichloride-donor complexes, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the aluminum trihalide or to the alkylaluminum halide, especially to the aluminum trichloride, in the donor complex generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the aluminum trihalide-donor complex or the alkylaluminum halide complex, especially the aluminum trichloride-donor complex, is prepared separately prior to the polymerization from the aluminum trihalide or the alkylaluminum halide, especially from anhydrous aluminum trichloride, and the donor compound, and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of a mono- or polyfunctional, especially mono-, di- or trifunctional, initiator which is selected from organic hydroxyl compounds, organic halogen compounds and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxy-phenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxy-phenyl)-2-propanol, 1-, 2-, 3- and 4-phenyl-1-butanol, 1-, 2-, 3- and 4-(p-methoxy-phenyl)-1-butanol, 1-, 2-, 3- and 4-phenyl-2-butanol, 1-, 2-, 3- and 4-(p-methoxy-phenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenyl-methanol, alpha-(p-tolyl)-benzhydrol, 1,1,2-triphenylethanol, alpha, alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxy-phenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)-phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)-benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an $sp^3$-hybridized carbon atom, organic halogen compounds, in which one or more halogen atoms are each bonded to an $sp^3$-hybridized carbon atom, and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary spa-hybridized carbon atom.

Preference is given in particular to initiators which may bear, on such an $sp^3$-hybridized carbon atom, in addition to the hydroxyl group, the $R^5$, $R^6$ and $R^7$ radicals, which are each independently hydrogen, $C_1$- to $C_{20}$-alkyl, $C_5$- to $C_8$-cycloalkyl, $C_8$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_1$-hydroxyalkyl or $C_1$- to $C_4$-haloalkyl radicals as substituents, where not more than one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

For the present invention, very particular preference is given to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene. Among these, preference is given in particular to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane and 1,3- or 1,4-bis(1-hydroxy-1-methylethyl)benzene.

The molar ratio of the initiators mentioned to the isobutene monomer used in the case of homopolymerization of isobutene, or to the total amount of the polymerizable monomers used in the case of copolymerization of isobutene, based on each individual functional site of the initiator, is generally 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene, is especially 0.0001:1 to 0.1:1, in particular 0.0002:1 to 0.05:1.

A proportion of the initiator molecules added as organic hydroxyl or halogen compounds is incorporated into the polymer chains. The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a nitrogen-containing basic compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_5$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butyl-pyridine or else 2-, 3,- or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as the isobutene source, the use of water as the sole initiator or as a further initiator has been found to be useful, in particular when polymerization is effected at temperatures of −20° C. to +30° C., especially of 0° C. to +20° C. At temperatures of −20° C. to +30° C., especially of 0° C. to +20° C., when a raffinate 1 stream is used as the isobutene source, it is, however, also possible to dispense with the use of an initiator.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1,2-methyl-pentene-1,2-methylhexene-1,2-ethylpentene-1,2-ethylhexene-1 and 2-propylheptene-1. Further useful comonomers include olefins which have a silyl group, such as 1-tri-methoxysilylethene, 1-(trimethoxysilyl)propene, 1-(trimethoxysilyl)-2-methylpropene-2,1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at at least 0° C., e.g. at 0° C. to +30° C. or at 0° C. to +50° C. The polymerization in the process according to the invention is, however, preferably performed at relatively low temperatures, generally at −70° C. to −10° C., especially at −60° C. to −15° C.

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloro-ethane, trichloroethane and 1-chlorobutane, and also halogenated aromatic hydrocarbons and alkylaromatics halogenated in the alkyl side chains, such as chlorobenzene, monofluoromethylbenzene, difluoromethylbenzene and trifluoromethylbenzene, and mixtures of the aforementioned diluents. The diluents used, or the constituents used in the solvent mixtures mentioned, are also the inert components of isobutenic $C_4$ hydrocarbon streams.

The inventive polymerization is preferably performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon; and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a further preferred embodiment, the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the aluminum trihalide-donor complex or the alkylaluminum halide complex, especially the aluminum trichloride-donor complex, is contacted with the isobutene or the isobutenic monomer mixture at the desired reaction temperature. The procedure here may be to initially charge the monomers, optionally in the diluent, to bring it to reaction temperature and then to add the aluminum trihalide-donor complex or the alkylaluminum halide complex, especially the aluminum trichloride-donor complex. The procedure may also be to initially charge the aluminum trihalide-donor complex or the alkylaluminum halide complex, especially the aluminum trichloride-donor complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the aluminum trihalide-donor complex or the alkylaluminum halide complex, especially the aluminum trichloride-donor complex. The reaction temperature can be established before or after the addition of the aluminum trihalide-donor complex or the alkylaluminum halide complex, especially of the aluminum trichloride-donor complex. The procedure may also be first to initially charge only one of the monomers, optionally in the diluent, then to add the aluminum trihalide-donor complex or the alkylaluminum halide complex, especially the aluminum trichloride-donor complex, and to add the further monomer(s) only after a certain time, for example when at least 60%, at least 80% or at least 90% of the monomer has been converted. Alternatively, the aluminum trihalide-donor complex or the alkylaluminum halide complex, especially the aluminum trichloride-donor complex, can be initially charged, optionally in the diluent, then the monomers can be added simultaneously or successively, and then the desired reaction temperature can be established. In that case, the start of polymerization is considered to be that time at which the aluminum trihalide-donor complex or the alkylaluminum halide complex, especially the aluminum trichloride-donor complex, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the aluminum trihalide-donor complex or the alkylaluminum halide complex, especially the aluminum trichloride-donor complex, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The aluminum trihalide-donor complex effective as a polymerization catalyst or the alkylaluminum halide complex, especially the aluminum trichloride-donor complex, is generally present in dissolved, dispersed or suspended form in the polymerization medium. Supporting of the aluminum trihalide-donor complex or of the alkylaluminum halide complex, especially of the aluminum trichloride-donor complex, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the aluminum trihalide-donor complex effective as a polymerization catalyst or the alkylaluminum halide complex, especially the aluminum trichloride-donor complex, is generally used in such an amount that the molar ratio of aluminum in the aluminum trihalide-donor complex or alkylaluminum halide complex, especially in the aluminum trichloride-donor complex, to isobutene in the case of homopolymerization of isobutene, or to the total amount of the polymerizable monomers used in the case of copolymerization of isobutene, is in the range from 1:5 to 1:5000, preferably from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, more preferably of more than 91 mol % and especially of at least 95 mol %, for example of virtually 100 mol %. More particularly, it also serves to prepare high-reactivity isobutene copolymers which are formed from isobutene and at least one vinylaromatic monomer, especially styrene, and have a content of terminal vinylidene double bonds (α-double bonds) per polyisobutene chain end of at least 50 mol %, preferably of at least 60 mol %, preferably of at least 70 mol %, preferably of at least 80 mol %, preferably of at least 80 mol %, preferably of at least 85 mol %, more preferably of at least 90 mol %, more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI, values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

Some of the isobutene polymers which have terminal vinylidene double bonds and also comprise incorporated initiator molecules and occur as the predominant proportion in the isobutene homopolymers prepared in accordance with the invention are novel compounds. The present invention therefore also provides isobutene polymers of the general formula I

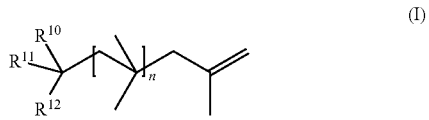

in which
$R^{10}$, $R^{11}$ and $R^{12}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl- or $C_1$- to $C_4$-alkoxy radicals or moieties of the general formula II

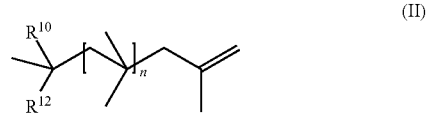

as substituents, where not more than one of the variables $R^{10}$, $R^{11}$ or $R^{12}$ is hydrogen and at least one of the variables $R^{10}$, $R^{11}$ or $R^{12}$ is phenyl which may also bear one or more $C_1$- to $C_4$-alkyl- or $C_1$- to $C_4$-alkoxy radicals or moieties of the general formula II as substituents, and
n is a number from 9 to 4500, preferably 9 to 180, especially 9 to 100, in particular 12 to 50.

In a preferred embodiment, $R^5$, $R^6$ and $R^7$ are each independently hydrogen, $C_1$- to $C_4$-alkyl, especially methyl, ethyl, n-propyl, isopropyl, n-butyl, isobutyl, sec.-butyl or tert-butyl, or phenyl which may also bear one or two $C_1$- to $C_4$-alkyl- or $C_1$- to $C_4$-alkoxy radicals or moieties of the general formula II as substituents, where not more than one of the variables $R^5$, $R^6$ and $R^7$ is hydrogen and at least one of the variables $R^5$, $R^6$ and $R^7$ is phenyl which may also bear one or two $C_1$- to $C_4$-alkyl or $C_1$- to $C_4$-alkoxy radicals or moieties of the general formula II as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 30 to 120 minutes, to give high-reactivity isobutene homo- or copolymers with a content of terminal vinylidene double bonds per polyisobutene chain end of at least 80 mol % and with a narrow molecular weight distribution.

The examples which follow are intended to illustrate the present invention in detail without restricting it.

EXAMPLE 1

Polymerization of Isobutene with $AlCl_3 \cdot Bu_2O$ without Initiator 1.43 g (25.5 mmol) of pure isobutene were polymerized in a mixture of 20 ml of dichloromethane and 5 ml of n-hexane at −20° C. with 0.62 mmol of the complex of aluminum trichloride and di-n-butyl ether in a molar ratio of 1:1 (in the form of a 1 molar solution in dichloromethane) within 30 minutes at a conversion of 71% to give a polyisobutene with a number-average molecular weight $M_n$ of 2095, a polydispersity (PDI) of 2.27 and a content of terminal vinylidene double bonds of 91 mol %.

EXAMPLE 2

Polymerization of Isobutene with $AlCl_3 \cdot EtOAc$ without Initiator 1.43 g (25.5 mmol) of pure isobutene were polymerized in a mixture of 20 ml of dichloromethane and 5 ml of n-hexane at −20° C. with 0.62 mmol of the complex of aluminum trichloride and ethyl acetate in a molar ratio of 1:1 (in the form of a 1 molar solution in dichloromethane) within 30 minutes at a conversion of 17% to give a polyisobutene with a number-average molecular weight $M_n$ of 1930, a polydispersity (PDI) of 1.45 and a content of terminal vinylidene double bonds of 88 mol %.

EXAMPLE 3

Polymerization of Isobutene with $AlCl_3 \cdot Bu2O$ with Cumene as an Initiator 1.43 g (25.5 mmol) of pure isobutene were polymerized in a mixture of 20 ml of dichloromethane and 5 ml of n-hexane at −40° C. with 0.62 mmol of the complex of aluminum trichloride and di-n-butyl ether in a molar ratio of 1:1 (in the form of a 1 molar solution in dichloromethane) in the presence of 0.5 mmol of 2-phenyl-2-propanol (cumene) as an initiator within 30 minutes at a conversion of 62% to give a polyisobutene with a number-average molecular weight $M_n$ of 1515, a polydispersity (PDI) of 1.45 and a content of terminal vinylidene double bonds of 90 mol %. The proportion of cumene-started polymer chains ($I_{eff}$) was 70%.

EXAMPLE 4

Polymerization of Isobutene with $AlCl_3 \cdot Bu_2O$ with Cumene as an Initiator 1.43 g (25.5 mmol) of pure isobutene were polymerized in a mixture of 20 ml of dichloromethane and 5 ml of n-hexane at −40° C. with 1.24 mmol of the complex of aluminum trichloride and di-n-butyl ether in a molar ratio of 1:1 (in the form of a 1 molar solution in dichloromethane) in the presence of 1.0 mmol of 2-phenyl-2-propanol (cumene) as an initiator within 30 minutes at a conversion of 76% to give a polyisobutene with a number-average molecular weight $M_n$ of 1180, a polydispersity (PDI) of 1.21 and a content of terminal vinylidene double bonds of 88 mol %. The proportion of cumene-started polymer chains ($I_{eff}$) was 90%.

EXAMPLE 5

Polymerization of Isobutene with $AlCl_3 \cdot Bu_2O$ with Cumene as an Initiator 1.43 g (25.5 mmol) of pure isobutene were polymerized in a mixture of 20 ml of dichloromethane and 5 ml of n-hexane at −60° C. with 0.62 mmol of the complex of aluminum trichloride and di-n-butyl ether in a molar ratio of 1:1 (in the form of a 1 molar solution in dichloromethane) in the presence of 0.5 mmol of 2-phenyl-2-propanol (cumene) as an initiator within 31 minutes at a conversion of 91% to give a polyisobutene with a number-average molecular weight $M_n$ of 2275, a polydispersity (PDI) of 1.83 and a content of terminal vinylidene double bonds of 85 mol %. The proportion of cumene-started polymer chains ($I_{eff}$) was 90%.

EXAMPLE 6

Polymerization of Isobutene with $AlCl_3 \cdot Bu_2O$ with Cumene as an Initiator 1.43 g (25.5 mmol) of pure isobutene were polymerized in a mixture of 15 ml of dichloromethane and 10 ml of n-hexane at −60° C. with 0.36 mmol of the complex of aluminum trichloride and di-n-butyl ether in a molar ratio of 1:1 (in the form of a 1 molar solution in dichloromethane) in the presence of 0.29 mmol of 2-phenyl-2-propanol (cumene) as an initiator within 120 minutes at a conversion of 56% to give a polyisobutene with a number-average molecular weight $M_n$ of 2690, a polydispersity (PDI) of 1.91 and a content of terminal vinylidene double bonds of 89 mol %. The proportion of cumene-started polymer chains ($I_{eff}$) was 88%.

EXAMPLE 7a

Polymerization of Isobutene with $AlCl_3 \cdot Bu_2O$ with Cumene as an Initiator 1.43 g (25.5 mmol) of pure isobutene were polymerized in a mixture of 15 ml of dichloromethane and 10 ml of n-hexane at −60° C. with 0.36 mmol of the complex of aluminum trichloride and di-n-butyl ether in a molar ratio of 1:1 (in the form of a 1 molar solution in dichloromethane) in the presence of 0.09 mmol of 2-phenyl-2-propanol (cumene) as an initiator within 30 minutes at a conversion of 47% to give a polyisobutene with a number-average molecular weight $M_n$, of 3510, a polydispersity (POI) of 2.17 and a content of terminal vinylidene double bonds of 95 mol %. The proportion of cumene-started polymer chains ($I_{eff}$) was 37%.

EXAMPLE 7b

Polymerization of Isobutene with $AlCl_3 \cdot Bu_2O$ with Cumene as an Initiator Example 7a was repeated, except that the reaction time was quadrupled: after 120 minutes, at a conversion of 62%, a polyisobutene was obtained with a number-average molecular weight $M_n$ of 3360, a polydispersity (PDI) of 1.93 and a content of terminal vinylidene double bonds of 91 mol % polymerized. The proportion of cumene-started polymer chains ($I_{eff}$) was 23%.

EXAMPLE 8

Polymerization of Isobutene with AlCl$_3$.Bu$_2$O with Cumene as an Initiator 2.97 g (53.0 mmol) of pure isobutene were polymerized in 66 ml of dichloromethane at −15° C. with 2.15 mmol of the complex of aluminum trichloride and di-n-butyl ether in a molar ratio of 1:1 (in the form of a 1 molar solution in dichloromethane) in the presence of 1.0 mmol of 2-phenyl-2-propanol (cumene) as an initiator within 60 minutes at a conversion of 40% to give a polyisobutene with a number-average molecular weight M$_n$ of 1675, a polydispersity (PDI) of 1.75 and a content of terminal vinylidene double bonds of 96 mol %.

EXAMPLE 9

Polymerization of Isobutene with AlCl$_3$.Bu$_2$O with Cumene as an Initiator 3.09 g (55.0 mmol) of pure isobutene were polymerized in 66 ml of dichloromethane at −60° C. with 1.80 mmol of the complex of aluminum trichloride and di-n-butyl ether in a molar ratio of 1:1 (in the form of a 1 molar solution in dichloromethane) in the presence of 1.0 mmol of 2-phenyl-2-propanol (cumene) as an initiator within 60 minutes at a conversion of 99% to give a polyisobutene with a number-average molecular weight M$_n$ of 1700, a polydispersity (PDI) of 1.82 and a content of terminal vinylidene double bonds of 96 mol %.

EXAMPLE 10

Polymerization of Isobutene with AlCl$_3$.0.8 Bu$_2$O with Cumene as an Initiator 1.43 g (25.5 mmol) of pure isobutene were polymerized in a mixture of 20 ml of dichloromethane and 5 ml of n-hexane at −20° C. with 0.62 mmol of the complex of aluminum trichloride and di-n-butyl ether in a molar ratio of 1:0.8 (in the form of a 1 molar solution in dichloromethane) in the presence of 0.5 mmol of 2-phenyl-2-propanol (cumene) as an initiator within 30 minutes at a conversion of 44% to give a polyisobutene with a number-average molecular weight M$_n$ of 1550, a polydispersity (PDI) of 1.74 and a content of terminal vinylidene double bonds of 87 mol %. The proportion of cumene-started polymer chains (I$_{eff}$) was 56%.

EXAMPLE 11

Polymerization of "Raffinate 1" with AlCl$_3$.Bu$_2$O with Cumene as an Initiator 7.43 g of "raffinate 1", comprising 2.97 g (53.0 mmol) of pure isobutene, were polymerized in 66 ml of dichloromethane at −30° C. with 2.15 mmol of the complex of aluminum trichloride and di-n-butyl ether in a molar ratio of 1:1 (in the form of a 1 molar solution in dichloromethane) in the presence of 1.0 mmol of 2-phenyl-2-propanol (cumene) as an initiator within 60 minutes at a conversion of 30% to give a polyisobutene with a number-average molecular weight M$_n$ of 1720, a polydispersity (PDI) of 2.04 and a content of terminal vinylidene double bonds of 93 mol %.

EXAMPLE 12a

Polymerization of Isobutene with AlCl$_3$.Bu$_2$O with Cumene as an Initiator 2.97 g (53.0 mmol) of pure isobutene were polymerized in 66 ml of dichloromethane at −60° C. with 1.43 mmol of the complex of aluminum trichloride and di-n-butyl ether in a molar ratio of 1:1 (in the form of a 1 molar solution in dichloromethane) in the presence of 1.0 mmol of 2-phenyl-2-propanol (cumene) as an initiator within 60 minutes at a conversion of 100% to give a polyisobutene with a number-average molecular weight M$_n$ of 6005, a polydispersity (PDI) of 2.26 and a content of terminal vinylidene double bonds of 94 mol %.

EXAMPLE 12b

Polymerization of Sobutene with BF$_3$.MeOH (for Comparison Against Inventive Example 12a)

2.97 g (53.0 mmol) of pure isobutene were polymerized in 66 ml of dichloromethane at −60° C. with 1.34 mmol of the complex of boron trifluoride and methanol in a molar ratio of 1:1 within 60 minutes at a conversion of 43% to give a polyisobutene with a number-average molecular weight M$_n$ of 4850, a polydispersity (PDI) of 4.05 and a content of terminal vinylidene double bonds of only 62.5 mol %.

EXAMPLE 13

Polymerization of Isobutene with AlCl$_3$.Bu$_2$O with 1-Phenyl-1-Chloroethane as an Initiator 1.43 g (25.5 mmol) of pure isobutene were polymerized in a mixture of 20 ml of dichloromethane and 5 ml of n-hexane at −40° C. with 0.62 mmol of the complex of aluminum trichloride and di-n-butyl ether in a molar ratio of 1:1 (in the form of a 1 molar solution in dichloromethane) in the presence of 0.5 mmol of 1-phenyl-1-chloroethane as an initiator within 30 minutes at a conversion of 77% to give a polyisobutene with a number-average molecular weight M$_n$ of 2170, a polydispersity (PDI) of 1.99 and a content of terminal vinylidene double bonds of 88 mol %. The proportion of 1-phenyl-1-chloroethane started polymer chains (I$_{eff}$) was 4%.

EXAMPLE 14

Polymerization of Isobutene with AlCl$_3$.Bu$_2$O with 1-(p-methoxyphenyl)-ethanol as an Initiator 1.43 g (25.5 mmol) of pure isobutene were polymerized in a mixture of 20 ml of dichloromethane and 5 ml of n-hexane at −20° C. with 0.62 mmol of the complex of aluminum trichloride and di-n-butyl ether in a molar ratio of 1:1 (in the form of a 1 molar solution in dichloromethane) in the presence of 0.5 mmol of 1-(p-methoxyphenyl)-ethanol as an initiator within 10 minutes at a conversion of 26% to give a polyisobutene with a number-average molecular weight M$_n$ of 960, a polydispersity (PDI) of 1.05 and a content of terminal vinylidene double bonds of 88 mol %.

EXAMPLE 15a

Polymerization of Isobutene with $AlCl_3 \cdot Bu_2O$ with Cumene as an Initiator in the Presence of Pyridine 1.43 g (25.5 mmol) of pure isobutene were polymerized in a mixture of 15 ml of dichloromethane and 10 ml of n-hexane at −60° C. with 0.36 mmol of the complex of aluminum trichloride and di-n-butyl ether in a molar ratio of 1:1 (in the form of a 1 molar solution in dichloromethane) in the presence of 0.09 mmol of 2-phenyl-2-propanol (cumene) as an initiator and 0.0125 mol of pyridine as a nitrogen-containing basic compound within 30 minutes at a conversion of 44% to give a polyisobutene with a number-average molecular weight $M_n$ of 2580, a polydispersity (PDI) of 1.86 and a content of terminal vinylidene double bonds of 90 mol %. The proportion of cumene-started polymer chains ($I_{eff}$) was 36%.

EXAMPLE 15b

Polymerization of Isobutene with $AlCl_3 \cdot Bu_2O$ and with Cumene as an Initiator in the Presence of Pyridine Example 15a was repeated, except that the reaction time was quadrupled: after 120 minutes, at a conversion of 53%, a polyisobutene was obtained with a number-average molecular weight $M_n$, of 2490, a polydispersity (PDI) of 1.84 and a content of terminal vinylidene double bonds of 91 mol % polymerized. The proportion of cumene-started polymer chains ($I_{eff}$) was 26%.

EXAMPLE 16

Polymerization of Isobutene with $AlCl_3 \cdot Bu_2O$ with Cumene as an Initiator in the Presence of Pyridine 1.43 g (25.5 mmol) of pure isobutene were polymerized in a mixture of 15 ml of dichloromethane and 10 ml of n-hexane at −20° C. with 0.36 mmol of the complex of aluminum trichloride and di-n-butyl ether in a molar ratio of 1:1 (in the form of a 1 molar solution in dichloromethane) in the presence of 0.09 mmol of 2-phenyl-2-propanol (cumene) as an initiator and 0.0125 mol of pyridine as a nitrogen-containing basic compound within 120 minutes at a conversion of 21% to give a polyisobutene with a number-average molecular weight $M_n$ of 1445, a polydispersity (PDI) of 1.69 and a content of terminal vinylidene double bonds of 94 mol %. The proportion of cumene-started polymer chains ($I_{eff}$) was 27%.

EXAMPLE 17

Polymerization of Isobutene with $AlCl_3 \cdot Bu_2O$ with Cumene as an Initiator in the Presence of Pyridine 1.43 g (25.5 mmol) of pure isobutene were polymerized in a mixture of 20 ml of dichloromethane and 5 ml of n-hexane at −40° C. with 0.62 mmol of the complex of aluminum trichloride and di-n-butyl ether in a molar ratio of 1:1 (in the form of a 1 molar solution in dichloromethane) in the presence of 0.5 mmol of 2-phenyl-2-propanol (cumene) as an initiator and 0.0125 mol of pyridine as a nitrogen-containing basic compound within 30 minutes at a conversion of 51% to give a polyisobutene with a number-average molecular weight $M_n$ of 1270, a polydispersity (PDI) of 1.17 and a content of terminal vinylidene double bonds of 91 mol %. The proportion of cumene-started polymer chains ($I_{eff}$) was 48%.

EXAMPLE 18

Polymerization of Isobutene with $AlCl_3 \cdot B_2O$ and with 1-phenyl-1-chloroethane as an Initiator 1.43 g (2.25 mmol) of pure isobutene were polymerized in a mixture of 20 ml of dichloromethane and 5 ml of n-hexane at −20° C. with 0.62 mmol of the complex of aluminum trichloride and di-n-butyl ether in a molar ratio of 1:1 (in the form of a 1 molar solution in dichloromethane) in the presence of 0.5 mmol of 1-phenyl-1-chloroethane as an initiator within 3 minutes at a conversion of 37% to give a polyisobutene with a number-average molecular weight $M_n$ of 3270, a polydispersity (PDI) of 1.76 and a content of terminal vinylidene double bonds of 97 mol %.

EXAMPLE 19

Polymerization of Isobutene with $AlCl_3 \cdot Bu_2O$ and with 1,4-bis(1-hydroxy-1-methylethyl)benzene as an Initiator 1.43 g (25.5 mmol) of pure isobutene were polymerized in a mixture of 20 ml of dichloromethane and 5 ml of n-hexane at −20° C. with 0.62 mmol of the complex of aluminum trichloride and di-n-butyl ether in a molar ratio of 1:1 (in the form of a 1 molar solution in dichloromethane) in the presence of 0.25 mmol of 1,4-bis(1-hydroxy-1-methylethyl)benzene as an initiator within 3 minutes at a conversion of 36% to give a polyisobutene with a number-average molecular weight $M_n$ of 2750, a polydispersity (PDI) of 1.99 and a content of terminal vinylidene double bonds of 94 mol %.

EXAMPLE 20

Polymerization of Isobutene with $AlCl_3 \cdot Bu_2O$ without Initiator 1.43 g (25.5 mmol) of pure isobutene were polymerized in a mixture of 15 ml of dichloromethane and 10 ml of n-hexane at −60° C. with 0.36 mmol of the complex of aluminum trichloride and di-n-butyl ether in a molar ratio of 1:1 (in the form of a 1 molar solution in dichloromethane) within 120 minutes at a conversion of 46% to give a polyisobutene with a number-average molecular weight $M_n$ of 7895, a polydispersity (PDI) of 2.23 and a content of terminal vinylidene double bonds of 94 mol %.

EXAMPLE 21

Polymerization of Isobutene with $AlCl_3 \cdot Bu_2O$ and with Water as an Initiator 1.43 g (25.5 mmol) of pure isobutene were polymerized in 25 ml of dichloromethane at −20° C. with 0.62 mmol of the complex of aluminum trichloride and di-n-butyl ether in a molar ratio of 1:1 (in the form of a 1 molar solution in dichloromethane) in the presence of 0.07 mmol of water as an initiator within 3 minutes at a conversion of 65% to give a polyisobutene with a number-average molecular weight $M_n$ of 2500, a polydispersity (PDI) of 1.92 and a content of terminal vinylidene double bonds of 92 mol %.

EXAMPLE 22

Polymerization of Isobutene with $AlCl_3.Bu_2O$ and with Cumene as an Initiator 1.43 g (25.5 mmol) of pure isobutene were polymerized in 25 ml of toluene at −20° C. with 0.62 mmol of the complex of aluminum trichloride and di-n-butyl ether in a molar ratio of 1:1 (in the form of a 1 molar solution in dichloromethane) in the presence of 0.5 mmol of 2-phenyl-2-propanol (cumene) as an initiator within 10 minutes at a conversion of 19% to give a polyisobutene with a number-average molecular weight $M_n$ of 1030, a polydispersity (PDI) of 2.65 and a content of terminal vinylidene double bonds of 89 mol %. The proportion of cumene-started polymer chains ($I_{eff}$) was 98%.

EXAMPLE 23

Polymerization of Isobutene with $AlCl_3.Bu_2O$ and with Cumene as an Initiator 1.43 g (25.5 mmol) of pure isobutene were polymerized in a mixture of 15 ml of toluene and 10 ml of trifluoromethylbenzene at −20° C. with 0.62 mmol of the complex of aluminum trichloride and di-n-butyl ether in a molar ratio of 1:1 (in the form of a 1 molar solution in dichloromethane) in the presence of 0.5 mmol of 2-phenyl-2-propanol (cumene) as an initiator within 3 minutes at a conversion of 24% to give a polyisobutene with a number-average molecular weight $M_n$ of 1095, a polydispersity (PDI) of 1.93 and a content of terminal vinylidene double bonds of 78 mol %. The proportion of cumene-started polymer chains ($I_{eff}$) was 94%.

EXAMPLE 24

Polymerization of Isobutene with $AlCl_3.Bu_2O$ and with Cumene as an Initiator 3.00 g (53 mmol) of pure isobutene were polymerized in 50 ml of dichloromethane at −60° C. with 187.2 mg of the complex of aluminum trichloride and di-n-butyl ether in a molar ratio of 1:1 (in the form of a 1 molar solution in dichloromethane) in the presence of 24.5 mg of 2-phenyl-2-propanol (cumene) as an initiator within 120 minutes at a conversion of 23% to give a polyisobutene with a number-average molecular weight $M_n$ of 3210, a polydispersity (PDI) of 1.90 and a content of terminal vinylidene double bonds of >99 mol %.

EXAMPLE 25

Polymerization of Isobutene with $AlCl_3.Bu_2O$ and with Cumene as an Initiator 3.00 g (53 mmol) of pure isobutene were polymerized in 50 ml of dichloromethane at −60° C. with 1140 mg of the complex of aluminum trichloride and di-n-butyl ether in a molar ratio of 1:1 (in the form of a 1 molar solution in dichloromethane) in the presence of 24.5 mg of 2-phenyl-2-propanol (cumene) as an initiator within 120 minutes at a conversion of 100% to give a polyisobutene with a number-average molecular weight $M_n$ of 4220, a polydispersity (PDI) of 2.05 and a content of terminal vinylidene double bonds of >99 mol %.

EXAMPLE 26

Polymerization of "Raffinate 1" with $AlCl_3.Bu_2O$ and with Cumene as an Initiator 7.50 g of "raffinate 1", comprising 3.00 g (53 mmol) of pure isobutene, were polymerized in 50 ml of dichloromethane at −60° C. with 566.8 mg of the complex of aluminum trichloride and di-n-butyl ether in a molar ratio of 1:1 (in the form of a 1 molar solution in dichloromethane) in the presence of 24.5 mg of 2-phenyl-2-propanol (cumene) as an initiator within 60 minutes at a conversion of 80% to give a polyisobutene with a number-average molecular weight $M_n$ of 4770, a polydispersity (PDI) of 2.67 and a content of terminal vinylidene double bonds of 96 mol %.

EXAMPLE 27

Polymerization of "Raffinate 1" with $AlCl_3.Bu_2O$ without Solvent and with Water as an Initiator 69.25 g of "raffinate 1", comprising 27.7 g (494 mmol) of pure isobutene, were polymerized in an autoclave with 6.54 g of the complex of aluminum trichloride and di-n-butyl ether prepared in situ in a molar ratio of 1:1, in the presence of 0.43 g (23.8 mmol) of water as an initiator without solvent at 0° C. within 60 minutes at a conversion of 76% to give a polyisobutene with a number-average molecular weight $M_n$ of 965, a polydispersity (PDI) of 2.86 and a content of terminal vinylidene double bonds of 76 mol %.

EXAMPLE 28

Polymerization of "Raffinate 1" with $AlCl_3.Bu_2O$ without Solvent and with Water as an Initiator 72.75 g of "raffinate 1", comprising 29.1 g (519 mmol) of pure isobutene, were polymerized in an autoclave with 6.79 g of the complex of aluminum trichloride and di-n-butyl ether prepared in situ in a molar ratio of 1:1, in the presence of 0.46 g (25.4 mmol) of water as an initiator without solvent at +20° C. within 60 minutes at a conversion of 69% to give a polyisobutene with a number-average molecular weight $M_n$ of 800, a polydispersity (PDI) of 2.69 and a content of terminal vinylidene double bonds of 70 mol %.

EXAMPLE 29

Polymerization of "Raffinate 1" with $AlCl_3.Bu_2O$ without Solvent and without Initiator 56.75 g of "raffinate 1", comprising 22.7 g (405 mmol) of pure isobutene, were polymerized in an autoclave with 6.57 g of the complex of aluminum trichloride and di-n-butyl ether prepared in situ in a molar ratio of 1:1 without solvent at +20° C. within 60 minutes at a conversion of 93% to give a polyisobutene with a number-average molecular weight $M_n$ of 1000, a polydispersity (PDI) of 2.90 and a content of terminal vinylidene double bonds of 76 mol %.

EXAMPLE 30

Polymerization of "Raffinate 1" with $AlCl_3.Bu_2O$ without Solvent and without Initiator 62.25 g of "raffinate 1", comprising 24.9 g (444 mmol) of pure isobutene, were polymerized in an autoclave with 6.56 g of the complex of aluminum trichloride and di-n-butyl ether prepared in situ in a molar ratio of 1:1 without solvent at 0° C. within 60 minutes at a conversion of 88% to give a polyisobutene with a number-average molecular weight $M_n$ of 1375, a polydispersity (PDI) of 2.94 and a content of terminal vinylidene double bonds of 69 mol %.

The invention claimed is:

1. A process for preparing high-reactivity isobutene homo- or copolymers with a content of terminal vinylidene double bonds per polyisobutene chain end of at least 50 mol %, which comprises polymerizing isobutene or an isobutene-comprising monomer mixture in the presence of an aluminum trihalide-donor complex effective as a polymerization catalyst or of an alkylaluminum halide-donor complex, said complex comprising, as the donor, an organic compound with at least one ether function or a carboxylic ester function.

2. The process according to claim 1, wherein isobutene or an isobutene-comprising monomer mixture is polymerized in the presence of an aluminum trichloride-donor complex effective as a polymerization catalyst.

3. The process according to claim 1, wherein the polymerizing is carried out in the presence of an aluminum trihalide-donor complex or an alkylaluminum halide-donor complex comprising, as the donor, a dihydrocarbyl ether of the general formula $R^1$—O—$R^2$ in which the variables $R^1$ and $R^2$ are each independently $C_1$- to $C_{20}$-alkyl radicals, $C_5$- to $C_8$-cycloalkyl radicals, $C_6$- to $C_{20}$-aryl radicals or $C_7$- to $C_{20}$-arylalkyl radicals.

4. The process according to claim 1, wherein the polymerizing is carried out in the presence of an aluminum trihalide-donor complex or an alkylaluminum halide-donor complex comprising, as the donor, a hydrocarbyl carboxylate of the general formula $R^3$—COOR$^4$ in which the variables $R^3$ and $R^4$ are each independently $C_1$- to $C_{20}$-alkyl radicals, $C_5$- to $C_8$-cycloalkyl radicals, $C_6$- to $C_{20}$-aryl radicals or $C_7$- to $C_{20}$-arylalkyl radicals.

5. The process according to claim 1, wherein the aluminum trihalide-donor complex or an alkylaluminum halide-donor complex has a total carbon number of 3 to 16.

6. The process according to claim 1, wherein the polymerization is performed with additional use of a mono- or polyfunctional initiator which is selected from organic hydroxyl compounds in which one or more hydroxyl groups are each bonded to an $sp^3$-hybridized carbon atom, organic halogen compounds in which one or more halogen atoms are each bonded to an $sp^3$-hybridized carbon atom and water.

7. The process according to claim 6, wherein the initiator is selected from the group consisting of water, methanol, ethanol, 1-phenylethanol, 1-(p-methoxyphenyl)ethanol, n-propanol, isopropanol, 2-phenyl-2-propanol, n-butanol, isobutanol, sec-butanol, tert-butanol, 1-phenyl-1-chloroethane, 2-phenyl-2-chloropropane, tert-butyl chloride and 1,3- or 1,4-bis(1-hydroxy-1-methylethyl)benzene.

8. The process according to claim 1, wherein the polymerization is performed in the presence of 0.01 to 10 mmol, based in each case on 1 mol of isobutene monomer in the case of homopolymerization of isobutene or on 1 mol of the total amount of the polymerizable monomers in the case of copolymerization of isobutene, of a nitrogen-containing basic compound.

9. The process according to claim 8, wherein the nitrogen-containing basic compound is pyridine or a derivative of pyridine.

10. The process according to claim 1, wherein the polymerizing forms high-reactivity isobutene homo- or copolymers with a number-average molecular weight $M_n$ of 500 to 250,000.

11. The process according to claim 1, wherein the polymerizing forms high-reactivity isobutene homo- or copolymers with a polydispersity of 1.05 to less than 3.5.

12. The process according to claim 1, wherein the polymerization is performed at a temperature of −60° C. to −15° C.

13. The process according to claim 1, wherein the polymerization is performed in a halogenated aliphatic hydrocarbon or in a mixture of halogenated aliphatic hydrocarbons or in a mixture of at least one halogenated aliphatic hydrocarbon and at least one aliphatic, cycloaliphatic or aromatic hydrocarbon as an inert diluent.

14. The process according to claim 1, wherein the polymerizing forms a high-reactivity isobutene of formula I or II:

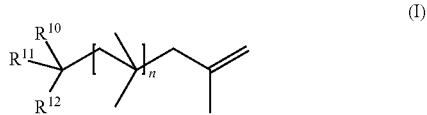

wherein $R^{10}$, $R^{11}$ and $R^{12}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl- or $C_1$- to $C_4$-alkoxy radicals,

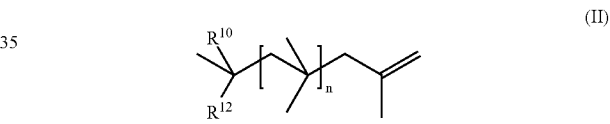

where not more than one of the variables $R^{10}$, $R^{11}$ or $R^{12}$ is hydrogen and at least one of the variables $R^{10}$, $R^{11}$ or $R^{12}$ is phenyl which may also bear one or more $C_1$- to $C_4$-alkyl- or $C_1$- to $C_4$-alkoxy radicals or moieties of the general formula II as substituents.

15. The process according to claim 14 wherein n is a number from 9 to 4500.

16. The process according to claim 1, wherein the polymerizing is carried out with at least one aluminum trihalide-donor complex selected from the group consisting of $AlCl_3.EtOAc$ and $AlCl_3.Bu_2O$.

17. The process according to claim 1, wherein the high-reactivity isobutene homo- or copolymers have a content of terminal vinylidene double bonds per polyisobutene chain end of at least 60 mol %.

18. The process according to claim 1, wherein the high-reactivity isobutene homo- or copolymers have a content of terminal vinylidene double bonds per isobutyene chain end of at least 70 mol %.

19. The process according to claim 1, wherein the polymerizing is carried out in a solution comprising the dissolved aluminum trihalide-donor complex.

20. The process according to claim 1, wherein the aluminum trihalide-donor complex consists of aluminum trichloride and the organic compound, wherein the organic compound is free of hydroxyl groups.

21. The process according to claim 1, wherein the polymerizing is carried out in the absence of alcohols.

22. The process according of claim 1, further comprising:
before the polymerizing, forming a solution of the aluminum trihalide-donor complex in situ.

23. The process according to claim 1, wherein the polymerizing is carried out without a solvent on a mixture comprising 30-50% by weight of isobutene, 10-50% by weight of 1-butene, 10-40% by weight of cis- and trans-2-butene and 2-35% by weight of one or more butanes.

24. The process according to claim 23, wherein the polymerizing polymerizes only the isobutene.

* * * * *